United States Patent [19]
Arai et al.

[11] Patent Number: 5,586,845
[45] Date of Patent: *Dec. 24, 1996

[54] FACE MILLING CUTTING INSERT HAVING CONVEX RAKES WITH OBTUSELY INTERSECTING FLAT SURFACES

[75] Inventors: Tatsuo Arai; Takayoshi Saito, both of Ibaragi-ken, Japan

[73] Assignee: Mitsubishi Materials Corporation, Tokyo, Japan

[*] Notice: The term of this patent shall not extend beyond the expiration date of Pat. No. 5,443,335.

[21] Appl. No.: 365,547

[22] Filed: Dec. 28, 1994

[30] Foreign Application Priority Data

Dec. 28, 1993 [JP] Japan ..................... 5-350015

[51] Int. Cl.⁶ .................. B23C 5/06; B23C 5/22
[52] U.S. Cl. ......................... 407/113; 407/42
[58] Field of Search ................. 407/42, 113, 115

[56] References Cited

U.S. PATENT DOCUMENTS

| | | | |
|---|---|---|---|
| 3,762,005 | 10/1973 | Erkfritz | 407/113 |
| 5,017,055 | 5/1991 | Tsujimura et al. | 407/113 |
| 5,314,269 | 5/1994 | Arai et al. | 407/42 |
| 5,443,335 | 8/1995 | Shimano et al. | 407/113 |

Primary Examiner—M. Rachuba
Assistant Examiner—Kenneth J. Hansen
Attorney, Agent, or Firm—Oblon, Spivak, McClelland, Maier & Neustadt, P.C.

[57] ABSTRACT

A cutting insert wherein cutting edges are formed on a pair of ridge portions of an upper surface and a pair of ridge portions on a lower surface in a staggered position relative to the ridge portions of the upper surface in a direction along the peripheries of the upper and lower surfaces. Rakes are formed on side surfaces of the insert body connecting to the cutting edges. Each rake has an inclination such as to be closer to a center of the upper or lower surface at a position remoter from the corresponding cutting edge. Each rake is formed of a curved surface which is formed along the side connecting to the cutting edge and which is curved along the peripheral direction so as to round out in an outward direction from the insert body, and a flat surface which obtusely intersects the curved surface and connect to a ridge portion opposite from the cutting edge formed along on the side of the rake. The positions and the shapes of the curved surface portions and the cutting edges are determined on the basis of the flat surfaces and the upper and lower surfaces. The insert can be prevented from shifting and the working accuracy can be improved by accurately forming the cutting edges and other portions.

2 Claims, 3 Drawing Sheets

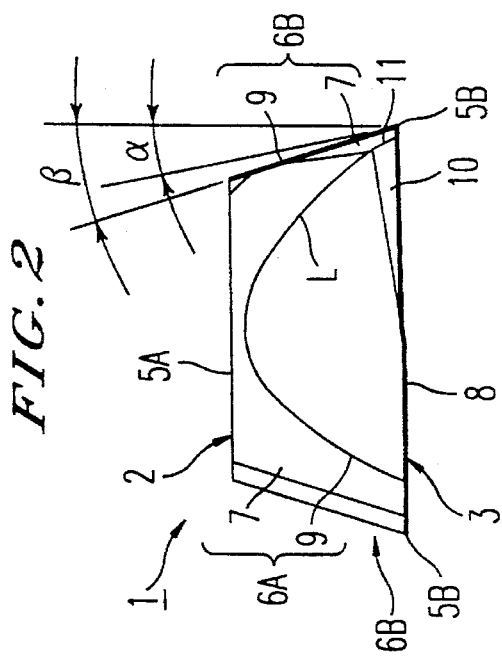
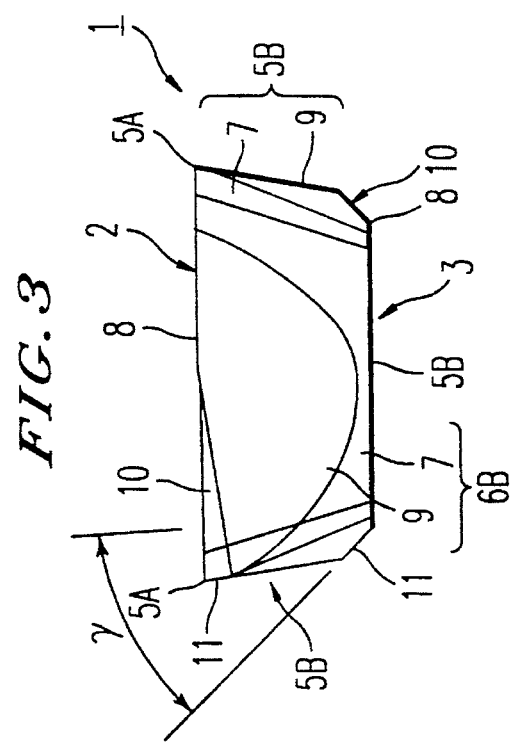
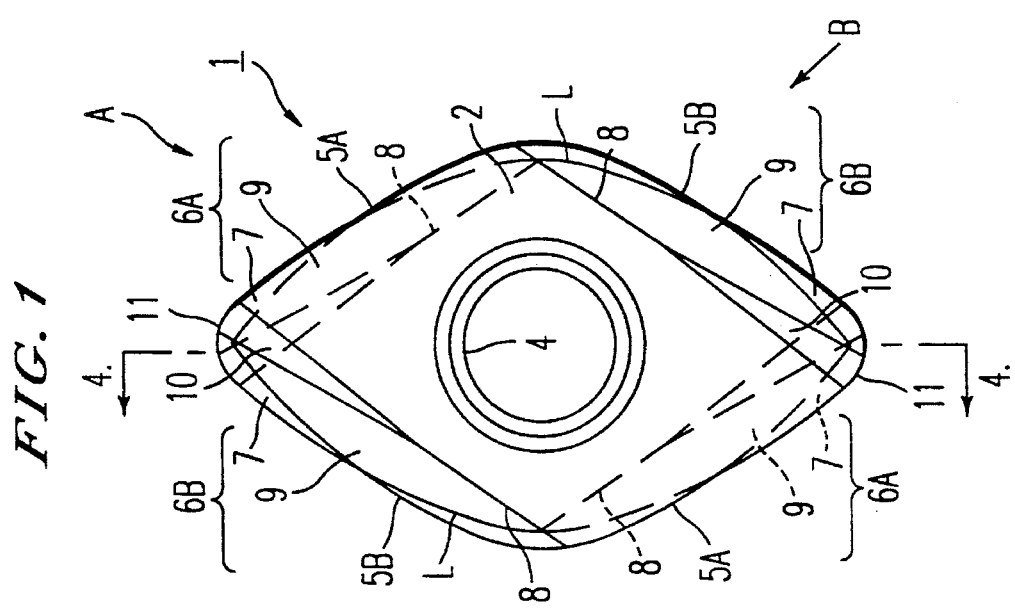

FACE MILLING CUTTING INSERT HAVING CONVEX RAKES WITH OBTUSELY INTERSECTING FLAT SURFACES

BACKGROUND OF THE INVENTION

1. Field of the Invention

The present invention relates to a positive type cutting insert which is detachably fitted to an outer peripheral portion of a tool such as a face milling cutter and a method of manufacturing the cutting insert.

2. Discussion of the Background

As a positive cutting insert of this kind (hereinafter referred to simply as "insert"), one such insert is that disclosed in Japanese Utility Model Laid-Open No. 63-136815 is known.

This insert has an insert body having a parallelogrammic plate-like shape and has cutting edges formed on a pair of ridge portions of an upper surface of the insert body and a pair of ridge portions of a lower surface of the insert body in a staggered position relative to the upper surface ridge portions in the direction along the periphery of the upper or lower surfaces. A rake is formed on each of side surfaces of the insert body connecting to the cutting edges. The rake is inclined toward a center of the upper or lower surfaces of the insert body away from the cutting edge in the direction of thickness of the insert body.

The entire surface of the rakes, connecting to the opposite pairs of the cutting edges of the upper and lower surfaces of the insert body, is formed of a convex curved surface such that the distance between the pair of rakes connecting to each opposite pair of cutting edges is larger at the centers of the cutting edges than at each of the leading and trailing ends of the cutting edges. That is, each of the rakes is formed by being curved along the periphery of the upper or lower surface having the corresponding one of the cutting edges on the ridge portion so as to round out in an outward direction from the insert body with such an inclination so as to be closer to a center of the lower or upper surface at a position closer to the lower or upper surface. Accordingly, the corresponding cutting edge is formed along a convex curved line, and a positive radial rake angle is set for the cutting edge.

The thus-arranged cutting insert is attached to a tool body of a cutting tool such as a face milling cutter in such a manner that one of the upper and lower surfaces is positioned as a flank on an outer circumferential side of the tool while the other is brought as a seated surface into contact with a bottom surface of an insert attachment seat, with one rake positioned so as to face in the tool rotating direction. Cutting is performed with the cutting edge positioned on the intersection ridge portion between this rake and the upper or lower surface that serves as a flank.

In the insert having the above-described construction, since each side surface is formed as a convex curved surface, the intersection angle between the side surface as a rake and the side surface (front end flank) disposed so as to face the tool front end side can be increased, thereby improving the strength of the insert at the intersection portion to prevent chipping or excessive wear. Further, since the cutting edge is formed so as to have a convex curved surface, the axial-direction rake angle of the cutting edge is gradually increased from the leading end to the trailing end of the cutting edge at the time of chamfering, thereby ensuring good cutting quality.

When the above-described insert is attached to the tool body, the two side surfaces other than the side surface set as a rake and the side surface set as a front end flank are brought into contact with a surface of the insert attachment seat facing the tool rotating direction and another surface facing the tool front end side, whereby the cutting edge is accurately positioned.

In the conventional insert, however, each of the side surfaces to be brought into contact with these surfaces of the attachment seat is entirely formed as a convex curved surface. Accordingly, it is possible that the insert body will be shifted relative to the insert attachment seat by sliding the curved surfaces on the seat to change the position of the cutting edge, resulting in a reduction in the accuracy of cutting with the cutting tool.

Ordinarily, this insert is designed or manufactured in such a manner that the shapes of the side surfaces formed as rakes are set on the basis of reference surfaces formed as flat-plane surfaces on the insert, and the positions at which the cutting edges are formed are determined on ridge portions in which the side surface and the upper and lower surface intersect each other. In the conventional insert, however, only the upper and lower surfaces serve as such reference flat-plane surfaces, and there is a need to form the rakes as convex curved surfaces. Therefore, it is difficult to accurately form the rakes and cutting edges in the predetermined positions. Consequently, it is possible that errors will occur with respect to the shapes of the rake and the cutting edges. Because of this possibility and the above-described possibility of a shift of the insert, there is a risk of the cutting accuracy being further reduced.

The accuracy of the cutting edges and the rakes of a manufactured insert is ordinarily measured on the basis of the flat surfaces of the insert. However, there is also a possibility of a hindrance with respect to accurate measurement of the conventional insert for the same reason.

SUMMARY OF THE INVENTION

The present invention has been achieved to solve the above-described problems, and it provides for an insert in which each of the rakes has a convex curved surface portion which is formed along one side of the corresponding side surface connecting to one cutting edge and which is curved along the peripheries of the upper or lower surface of the insert body so as to be rounded out in an outward direction from the insert body, and a flat surface portion which obtusely intersects the convex curved surface portion and which connects to the ridge portion of the side surface opposite the cutting edge.

The present invention therefore provides for a cutting insert which comprises an insert body having a parallelogrammic plate-like shape; cutting edges formed in a peripheral direction along peripheries of upper and lower surfaces of the insert body on a pair of opposite ridge portions of the upper surface of the insert body and a pair of opposite ridge portions of the lower surface of the insert body in a staggered position relative to the pair of upper surface ridge portions; and rakes for the cutting edges, the rakes being formed in side surfaces of the insert body connecting to the cutting edges, each of the rakes having such an inclination as to be closer to a center of one of the upper and lower surfaces of the insert body at a position more remote from the corresponding one of the cutting edges along a direction of thickness of the insert body. As noted above, each of the rakes has a convex curved surface portion which is formed along one side of the corresponding side surface connecting to the cutting edge and which is curved along the peripheral direction so as to be rounded out in an outward direction from the insert body, and a flat surface portion which obtusely intersects the convex curved surface portion and which connects to the ridge portion of the side surface opposite the cutting edge.

The present invention also provides for a method of manufacturing an insert comprising the steps of preparing an insert body having a parallelogrammic plate-like shape, setting a flat portion in each of side surfaces of the insert body adjacent to a pair of opposite ridge portions of an upper surface of the insert body and a pair of opposite ridge portions of a lower surface of the insert body in a staggered position relative to the pair of ridge portions of the upper surface in a peripheral direction along the peripheries of the upper and lower surfaces, the flat portion having such an inclination as to be closer to a center of one of the upper and lower surfaces of the insert body at a position more remote from the corresponding one of the ridge portions, setting a curved surface portion in each side surface on the ridge portion side on the basis of the flat surface portion and the upper and lower surfaces of the insert body, the curved surface portion obtusely intersecting the flat surface portion, the curved surface portion being curved along the peripheral direction so as to be rounded out in an outward direction from the insert body, and determining a cutting edge formation position on the ridge portion at which each curved surface portion and the corresponding one of the upper and lower surfaces of the insert body intersect each other.

In the insert having the above-described construction, each side surface which serves as a rake is formed of a convex curved surface portion which is formed so as to connect to one cutting edge, and a flat surface portion which is formed so as to connect to the ridge portion opposite from the cutting edge. Therefore, the operation of attaching the insert to a tool body may be performed in such a manner that the flat surface portion of the side surface is brought into contact with a surface of an insert attachment seat. The insert body can be firmly fixed on the insert attachment seat by the effect of contact between flat-plane surfaces, thereby preventing the insert body from shifting at the time of attachment and other operations.

In the above-described insert manufacturing method, the flat surface portions are first set on the side surfaces of the insert body, and the above-mentioned convex curved surface portions are thereafter set on the side surfaces on the basis of these flat surface portions and the upper and lower surfaces of the insert body, whereby the positions at which the cutting edges are formed are determined as intersection ridge portions between the convex curved surfaces and the upper and lower surfaces. It is therefore possible to accurately set the convex curved surfaces used as rakes and the cutting blades in accordance with the desired positions and shapes. Also, when the accuracy of a manufactured insert is measured, the measurement can be performed with improved accuracy because there are a plurality of reference flat surfaces other than the upper and lower surfaces.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a plan view of an insert body in accordance with an embodiment of the present invention as seen from an upper surface side;

FIG. 2 is a side view as seen in the direction of arrow A in FIG. 1;

FIG. 3 is a side view as seen in the direction of arrow B in FIG. 1;

DESCRIPTION OF THE PREFERRED EMBODIMENTS

Figure 4:
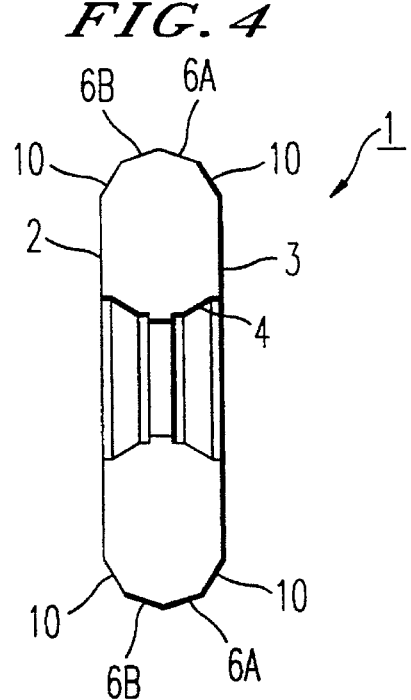
FIG. 4 is a cross-sectional view taken along the line 4—4 of FIG. 1.

Referring now to the drawings, wherein like reference numerals designate identical or corresponding parts throughout the several views, and more particularly to FIGS. 1–4 thereof, an insert body 1 shown in these figures is formed of a hard material such as a cemented carbide. The insert body 1 is a plate-like member having a generally rhombic shape as viewed in plan perpendicularly to an upper surface 2 side or a lower surface 3 side. An attachment hole 4 is formed through a portion of the insert body 1 in the direction of the thickness thereof (hereinafter referred to as "insert thickness direction") at a center of the insert body 1 as viewed in plan. A clamp screw is inserted into the attachment hole 4 when the insert body 1 is attached to a tool body.

Cutting edges 5A, 5A are formed on a pair of opposite ridge portions in four ridge portions of the upper surface 2. A pair of side surfaces which connect to the edges 5A, 5A among four side surfaces of the insert body 1 are formed as rakes 6A, 6A for the cutting edges 5A, 5A. On the other hand, cutting edges 5B, 5B are also formed on a pair of opposite ridge portions in four ridge portions of the lower surface 3. At the ridge portions on which the cutting edges 5B, 5B are formed, the pair of side surfaces other than the pair of side surfaces on which the rakes 6A, 6A are formed intersect the lower surface 3. On this pair of side surfaces, rakes 6B, 6B for the cutting edges 5B, 5B are formed.

In other words, the cutting edges 5A, 5B are formed in such a manner that if one cutting edge 5A is formed on one ridge portion of the upper surface 2 so as to extend in a direction along the periphery of the upper or lower surface 2 or 3 as viewed in plan in a direction perpendicular to the upper surface 2 and lower surface 3, then one cutting edge 5B is formed on a ridge portion of the lower surface 3, which is adjacent to the above-mentioned ridge portion of the upper surface 2 as viewed in plan, another cutting edge 5A is then formed on the ridge portion of the upper surface 2 opposite from the first ridge portion, and another cutting edge 5B is formed on the ridge portion of the lower surface 3 opposite from the above-mentioned ridge portion of the lower surface 3. That is, the cutting edges 5A, 5B are successively formed in the peripheral direction on pairs of ridge portions of the upper and lower surfaces 2, 3, which are alternately located on the upper surface 2 side and then on the lower surface 3 side.

The rakes 6A, 6B connecting to the cutting edges 5A, 5B are each formed generally with an inclination between the cutting edge 5A or 5B and the lower surface 3 or the upper surface 2 so as to be closer to a center of the lower surface 3 or the upper surface 2, i.e., the opening of the attachment hole 4 at a position closer to the lower surface 3 or the upper surface 2 in the insert thickness direction. Therefore, each of the side surfaces of the insert body on which rakes 6A and 6B are formed has a generally trapezoidal shape as viewed in a direction of facing the side surface, as shown in FIG. 2 or 3.

In this embodiment, each of the rakes 6A is formed of a convex curved surface portion 7 which connects to the cutting edge 5A, and a flat surface portion 9 which obtusely intersects the convex curved surface portion 7 and which connects to a ridge portion opposite the cutting edge 5A of the corresponding side surface, i.e., a ridge portion 8 of the lower surface 3 where no cutting edge 5B is formed. Similarly, each of the rakes 6B is formed of a convex curved surface portion 7 which connects to the cutting edge 5B, and a flat surface portion 9 which obtusely intersects the convex curved surface portion 7 and which connects to a ridge portion opposite from the cutting edge 5B of the corresponding side surface, i.e., a ridge portion 8 of the upper surface 2 where no cutting edge 5A is formed.

As described above with respect to the rakes 6A and 6B, the convex curved surface 7 constituting the rake 6A or 6B has an inclination between the cutting edge 5A or 5B and the lower surface 3 or the upper surface 2 such as to be closer to a center of the lower surface 3 or the upper surface 2 as in a cross section generally perpendicular to the convex curved surface 7 at a position closer to the lower surface 3 or the upper surface 2. Also, the convex surface 7 is curved along the periphery of the upper or lower surface 2 or 3 so as to round out generally in a radially-outward direction from the insert body 1. Accordingly, the cutting edge 5A or 5B formed at the intersection ridge between the convex surface 7 and the upper or lower surface 2 or 3 is formed so as to have a curved line along the peripheral direction, which rounds out generally in a radially-outward direction from the insert body 1 as viewed in plan perpendicularly to the upper and lower surfaces 2 and 3.

The curvature of the convex curved surface 7 is set so that the distance between the cutting edge 5A or 5B and an imaginary line which connects the two ends of the convex curve line of the cutting edge 5A or 5B is maximized at the center of the cutting edge 5A or 5B. Further, the angle by which the convex curved surface 7 is inclined from the insert thickness direction at the center of the cutting edge 5A or 5B is set to 110° in this embodiment.

On the other hand, the flat surface 9 constituting the rake 6A or 6B has an angle from the insert thickness direction, which is larger than the angle α, and which is set to 18° in this embodiment. Accordingly, the convex curved surface 7 and the flat surface 9 obtusely intersect each other, as mentioned above, and an intersection ridge line L therebetween is seen as a line which is convex on the cutting edge 5A or 5B side as viewed in FIG. 2 or 3. The convex curve line, i.e., the intersection ridge line L, is closest to the cutting edge 5A or 5B at the center of the same but it does not intersect the cutting edge 5A or 5B.

Further, in this embodiment, minor flanks 10 are formed in intersection ridge portions between the upper and lower surfaces 2, 3 and flat surfaces 9 of the rakes 6, i.e., four ridge portions 8 where no cutting edges 5A, 5B are formed in the ridge portions of the upper and lower surfaces 2, 3, and minor cutting edges 11 are formed on intersection ridges between the minor flanks 10 and the convex curved surfaces 7 of the rakes 6 so as to connect to the cutting edges 5.

Each minor flank 10 is formed so as to obtusely intersect both the upper or lower surface 2 or 3 and the adjacent flat surface 9. In this embodiment, the angle γ of each minor flank 10 from the insert thickness direction is set to 45°. Also, each minor flank 10 is formed in such a manner as to rise outwardly in the insert thickness direction (vertical direction) away from the minor cutting edge 11, so that the width of the minor flank 10 is smaller at a position more remote from the minor cutting edge 11. Each minor flank 10 does not reach the end of the ridge portion 8 opposite the minor cutting edge 11.

In this embodiment, the cutting edges 5 are formed with identical shapes, and the minor cutting edges 11, the rakes 6 and other portions are also formed into respective identical shapes. Each of the cutting edges 5 and the minor cutting edges 11 is honed.

Figure 5:
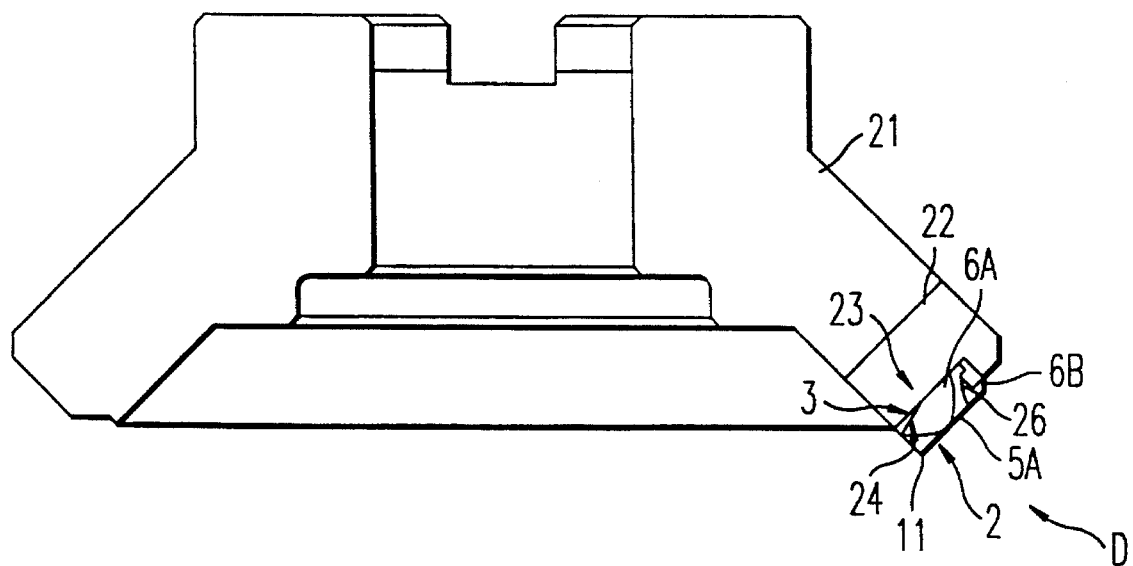
FIG. 5 is a sectional side view of a thrown-away type face milling cutter to which the insert of the embodiment shown in FIG. 1 is attached.
Figure 7:
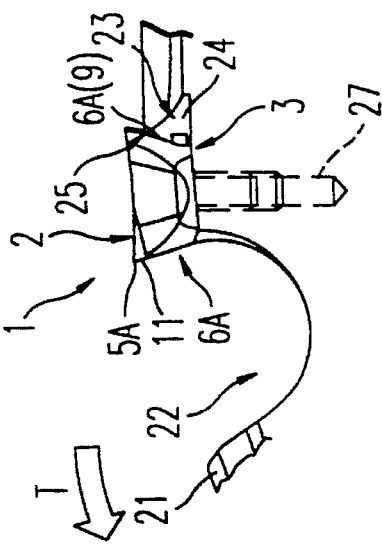
FIG. 7 is an enlarged side view as seen in the direction arrow D in FIG. 5.
Figure 8:
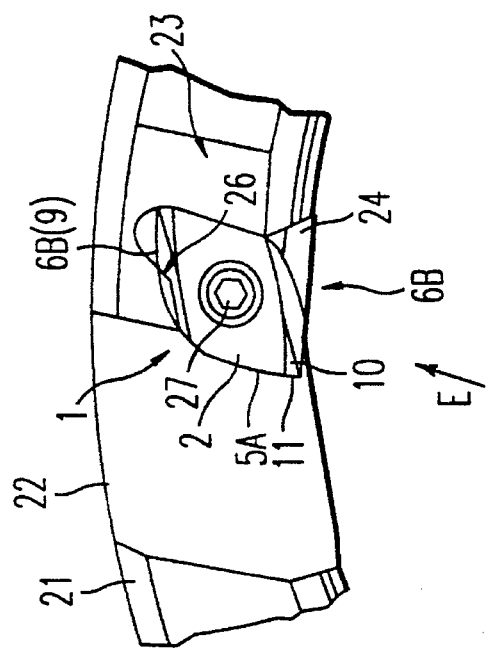
FIG. 8 is a bottom view as seen in the direction arrow E in FIG. 5.
Figure 6:
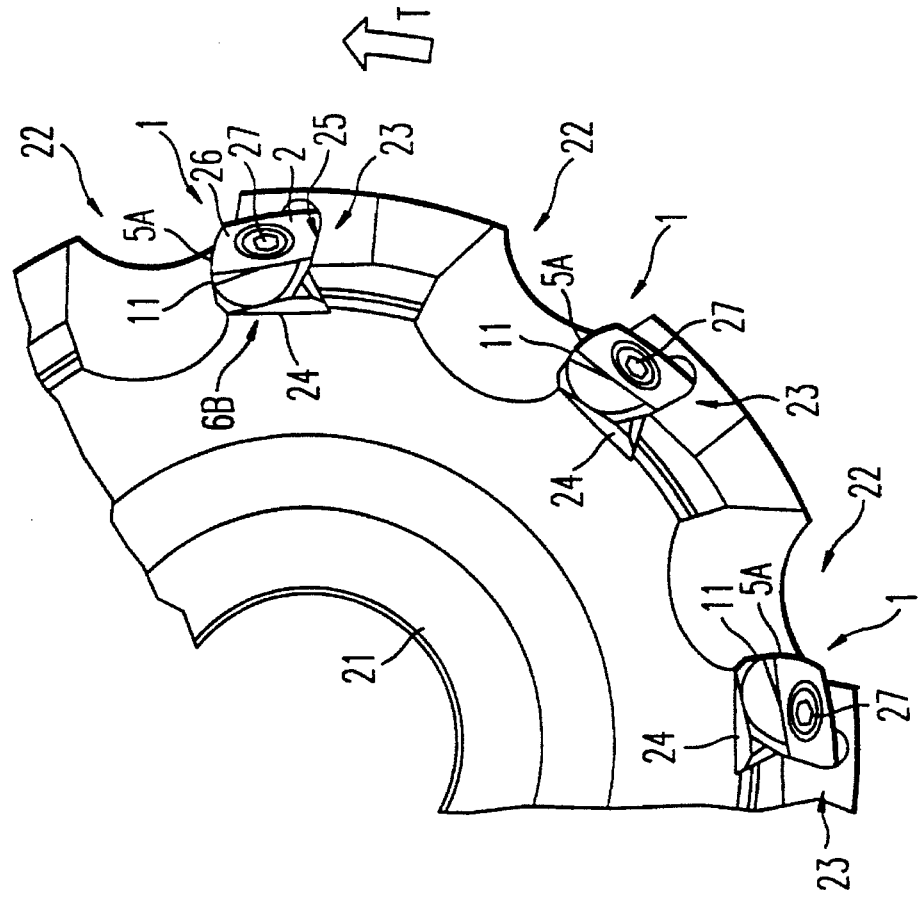
FIG. 6 is a bottom view of the face milling cutter shown in FIG. 5, as seen from the front end side.

FIGS. 5 through 8 illustrate a case where cutting inserts each having the above-described construction are attached to a face milling cutter.

Referring to these figures, a plurality of insert pockets 22 are formed in an outer circumferential portion of a generally-disk-like tool body 21 at equal intervals along a circumferential direction. The cutting insert of the above-described embodiment is mounted on an insert attachment seat formed in each insert pocket 22 on the trailing side with respect to the direction in which the tool rotates (the direction of arrow T in the figures).

The insert attachment seat 23 is formed of an attachment seat surface 24 facing an outer circumferential end of the tool, an attachment seat surface 25 facing in the tool rotating direction, and an attachment seat surface 26 facing a tool front end. The above-described cutting insert is set on the insert attachment seat 23 in such a manner that one of the upper end lower surfaces 2, 3 of the insert body 1 is located on the tool outer circumferential end side, the other of the lower surfaces 2, 3 is brought into close contact with the attachment seat surface 24, and one cutting edge 5 formed on the ridge portion of the one surface 2 or 3 on the tool circumferential end side is positioned on the tool rotating direction front side with a predetermined positive axial-direction rake angle. In this state, the cutting insert is detachably mounted on the tool body 21 with a clamp screw 27. However, in the case illustrated in FIGS. 5 through 8, the upper surface 2 is located on the tool outer circumferential end side to use one cutting edge 5A formed on the ridge potion of the upper surface 2.

In this case, one of the side surfaces of the insert body 1 having the rake 6A connecting to the above-mentioned one cutting edge 5A is set in the tool rotating direction, while the side surface opposite from this side surface faces in the direction opposite to the tool rotating direction and contacts the attachment seat surface 25. One of the side surfaces having the other two rakes 6B, 6B is located on the tool front end side while the other is located on the tool base side and maintained in contact with the attachment seat surface 26.

In the above-described insert construction, each of the rakes 6 formed on the side surfaces of the insert body 1 is formed of a convex curved surface 7 and the flat surface 9. When the insert body 1 is mounted on the insert attachment seat 23 and when the above-mentioned one cutting edge 5A is positioned, the insert body 1 is set so that the flat surfaces 9 in the rakes 6A, 6B of the side surfaces brought into contact with the attachment seat surfaces 25, 26 contact the attachment seat surfaces 25, 26, whereby the insert body 1 is firmly positioned by the two flat surfaces that are disposed along directions obliquely intersecting each other.

Therefore, by virtue of the insert construction of this embodiment, any shifting of the insert body 1 can be prevented at the time of attachment and even when an excessive load is imposed upon the insert during cutting. Consequently, it is possible to perform high precision cutting by preventing a reduction in cutting accuracy due to such a shift of the insert body 1 during working with a cutting tool such as a face milling cutter.

On the other hand, convex surface 7 is formed in the rake 6A of the cutting edge 5A used for cutting and, accordingly, the cutting edge 5A is formed along a convex curved line, thereby achieving the same effects as those of the above-described conventional arrangement, i.e., both the effect of increasing the intersection angle between the rake 6A used for cutting and the side surface located on the tool front end side to prevent chipping or the like in the intersection portion, and the effect of gradually increasing the axial-direction rake angle of the cutting edge 5A from the leading end to the trailing end of the cutting edge 5A at the time of chamfering to ensure improved cutting quality.

Further, the rake 6A is formed of the convex curved portion 7 and the flat portion 9 as a surface bent two times along a direction in which a chip formed by the cutting edge 5A slides on the surface. Therefore, the frictional resistance acting from the rake 6A to the chip is reduced when the chip moves beyond the intersection ridge line L between the convex curved portion 7 and the flat portion 9. That is, it is also possible to achieve an effect of reducing the cutting force and improving the chip removing performance.

The cutting insert of this embodiment can be rotated about its attachment hole 4 through 180° to use the other one of the cutting edges 5A of the upper surface 2 for cutting. Also, the cutting insert of this embodiment can be turned so that the positions of the upper and lower surfaces 2 and 3 are inverted to use the cutting edges 5B, 5B of the lower surface 3 side for cutting. That is, one cutting insert can be used four times by rotation, and can be used with the above-described effects with respect to each cutting edge 5.

The above-described cutting insert may be designed or manufactured in such a manner that portions to be formed as flat surfaces 9 of rakes 6 are first set on the basis of upper and lower surfaces 2, 3 of insert body 1, the positions and the shapes of convex surfaces 7 and minor flanks 10 are then set on the basis of the flat surfaces 9 and the upper and lower surfaces 2, 3, and the positions and the shapes of cutting edges 5 and minor cutting edges 11 are thereafter determined.

For example, the position of minor cutting edge 11 connecting to one cutting edge 5A formed on the ridge portion of the upper surface 2 is determined on the basis of flat surface 9 of rake 6A connecting to cutting edge 5A of the upper surface 2 opposite from the above-mentioned one cutting edge 5A, flat surface 9 of rake 6B connecting to ridge portion 8 opposite the ridge portion 8 on which the minor flank 10 corresponding to the positioned minor cutting edge 11 is formed, and the lower surface 3. That is, in the case of using the minor cutting edge 11 for cutting in the face milling cutter shown in FIGS. 5 through 8, the minor cutting edge 11 is determined on the basis of the lower surface 3 of the insert body 1 in close contact with attachment seat surface 24 of insert attachment seat 23, and flat surfaces 9, 9 of rakes 6A, 6B in contact with attachment seat surfaces 25, 26.

Thus, according to this insert manufacturing method, the positions and the shapes of cutting edges 5 and minor cutting edges 11 can be determined on the basis of a plurality of flat surfaces to form cutting edges 5 and minor cutting edges 11. It is therefore possible to form cutting edges 5 and minor cutting edges 11 or rakes 6 and minor flanks 10 with high accuracy. Also, by a synergism of this effect and the above-mentioned insert shift preventing effect, the accuracy with which cutting edge 5 and minor cutting edge 11 used for cutting are positioned can be further improved. Thus, cutting with a cutting tool using the cutting insert of the present invention can be performed with markedly improved accuracy.

After the manufacture of the cutting insert, the accuracy with which cutting edges 5, minor cutting edges 11 or rakes 6, convex curved surfaces 7 and minor flanks 10 have been formed can also be measured on the basis of upper and lower surfaces 2, 3 and flat surfaces 9 of rakes 6. It is therefore possible to accurately measure the accuracy with which these portions are formed.

The embodiment has been described with respect to a cutting insert having a rhombic configuration as viewed in plan in a direction perpendicular to the upper and lower surfaces 2, 3. However, the present invention can also be applied to plate-like cutting inserts having other shapes, e.g., a square and a parallelogram.

The above-described minor flanks 10 may be formed into a flat shape as in the case of flat surfaces 9 in rakes 6. Alternatively, the minor flanks 10 may be formed along the ridges 8 as convex curved surfaces which round out in an outward direction from the insert body 1, as in the case of convex curved surfaces 7. Such minor flanks 10 and minor cutting edges may be removed, for example, in a case where the cutting insert is used as a disposable type outer circumference cutting edge of an end mill.

As described above, in the cutting insert of the present invention, convex surfaces in rakes and convex curved cutting edges connecting to the convex surfaces serve to prevent chipping and to improve the cutting quality, and flat surfaces in the rakes are brought into contact with attachment seat surfaces of an insert attachment seat to prevent the insert from shifting when the insert is attached to a tool body or when an excessively large cutting load is imposed upon the insert, whereby high attachment accuracy is achieved. It is therefore possible to position the cutting edges very accurately so that the cutting accuracy of the cutting tool is improved.

According to the cutting insert manufacturing method of the present invention, the positions and the shapes of cutting edges and rakes are determined on the basis of a plurality of flat surfaces, so that the cutting edges and the rakes can be formed with high accuracy. By this effect and by the above-described insert shift preventing effect, it is possible to provide a cutting insert having further improved attachment accuracy. It is also possible to accurately measure the insert configuration or the like on the basis of the plurality of flat surfaces after the manufacture of the insert.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A cutting insert comprising:
an insert body having a parallelogrammic plate shape;

a plurality of cutting edges formed in a peripheral direction along peripheries of upper and lower surfaces of said insert body on a pair of opposite ridge portions of the upper surface of said insert body and a pair of opposite ridge portions of the lower surface of said insert body in a staggered position relative to the pair of upper surface ridge portions; and a first and second pair of rakes extending from said cutting edges, said rakes being formed in side surfaces of said insert body connecting to said cutting edges, each of said rakes being inclined with respect to the upper and lower surface;

wherein each of said rakes has a convex curved surface portion which is formed along one side of the corresponding side surface connecting to said cutting edge and which is curved along said peripheral direction so as to round out in an outward direction from said insert body, and a flat surface portion which obtusely intersects said convex curved surface portion and which connects to the ridge portion of the side surface opposite said cutting edge.

2. A cutting insert comprising:

an insert body having a parallelogrammic plate shape;

a plurality of cutting edges formed in a peripheral direction along peripheries of upper and lower surfaces of said insert body on a pair of opposite ridge portions of the upper surface of said insert body and a pair of opposite ridge portions of the lower surface of said insert body in a staggered position relative to the pair of upper surface ridge portions; and a plurality of rakes respectively extending from said cutting edges, said rakes being formed in side surfaces of said insert body connecting to said cutting edges, each of said rakes being inclined with respect to the upper and lower surface;

wherein each of said rakes has a convex curved surface portion which is formed along one side of the corresponding side surface connecting to said cutting edge and which is curved along said peripheral direction so as to round out in an outward direction from said insert body, and a flat surface portion which obtusely intersects said convex curved surface portion and which connects to the ridge portion of the side surface opposite said cutting edge;

wherein a minor flank is formed in each of the ridge portions where none of said cutting edges is formed other than said pairs of ridge portions of the upper and lower surfaces of said insert body, said minor flank obtusely intersecting the upper or lower surface and the side surface having the same ridge portion therebetween, and wherein a minor cutting edge is formed on an intersection ridge between said minor flank and said rake of the side surface adjacent to the side surface having the ridge portion in which said minor flank is formed.

* * * * *